Aug. 15, 1961   A. G. STIMSON ET AL   2,996,673
ELECTRICAL MEASURING INSTRUMENT
Filed Dec. 23, 1959   3 Sheets-Sheet 1

ALLEN G. STIMSON
EDWARD J. FOX
HERMAN P. REXER
INVENTORS

BY R. Frank Smith
Robert W. Hampton
ATTORNEYS

ALLEN G. STIMSON
EDWARD J. FOX
HERMAN P. REXER
INVENTORS

ATTORNEYS

Aug. 15, 1961 A. G. STIMSON ET AL 2,996,673
ELECTRICAL MEASURING INSTRUMENT
Filed Dec. 23, 1959 3 Sheets-Sheet 3

ALLEN G. STIMSON
EDWARD J. FOX
HERMAN P. REXER
INVENTORS

BY
ATTORNEYS

United States Patent Office 2,996,673
Patented Aug. 15, 1961

2,996,673
ELECTRICAL MEASURING INSTRUMENT
Allen G. Stimson, Edward J. Fox, and Herman P. Rexer, Rochester, N.Y., assignors to Eastman Kodak Company, Rochester, N.Y., a corporation of New Jersey
Filed Dec. 23, 1959, Ser. No. 861,526
8 Claims. (Cl. 324—151)

The present invention relates to pivoted-coil electric measuring instruments and more particularly to such instruments having permanent magnet cores.

The development of highly efficient magnetic materials has permitted the designers of pivoted-coil electric measuring instruments to dispense with the older form of instruments having heavy and bulky external permanent and soft iron cores and to substitute permanent magnet cores of much smaller and lighter construction cooperating with outer, soft-iron magnetic return members, or "keepers." The available strength of the newer core magnets has permitted substantial miniaturization of the entire instrument. In order to achieve further miniaturization of such an instrument, its coil may be rotated on pivots which extend inwardly from a frame that supports the coil, in which case the pivots turn in bearings that are adjustably supported within a central bore extending through the permanent magnet core along its axis.

Although instruments constructed according to the above general design have been substantially miniaturized they have presented a serious problem with regard to adjustable support of their pivot bearings within the axial bore of the core magnet. Since the stronger magnetic materials are so hard that they must be cast or sintered and then finished by grinding, considerable expense has attended the construction of prior art core-magnet instruments with sufficiently accurate dimensions to locate the bearing supports properly.

It is therefore a principal object of the present invention to support the bearings of a pivoted-coil electric measuring instrument within a central bore of a small permanent core magnet, by means of structure located by only one surface of the core magnet.

A more particular object of the invention is to provide a first bearing holder that is attached to a finished surface of the core magnet of such an instrument and which in turn adjustably supports a second bearing holder.

A further object of the invention is to secure a first bearing holder to a finished face of a cylindrical core magnet of such an instrument and to support a second bearing holder in threading engagement with the first holder.

Other objects of the invention will appear from the following description, reference being made to the accompanying drawings, wherein.

Figure 1:
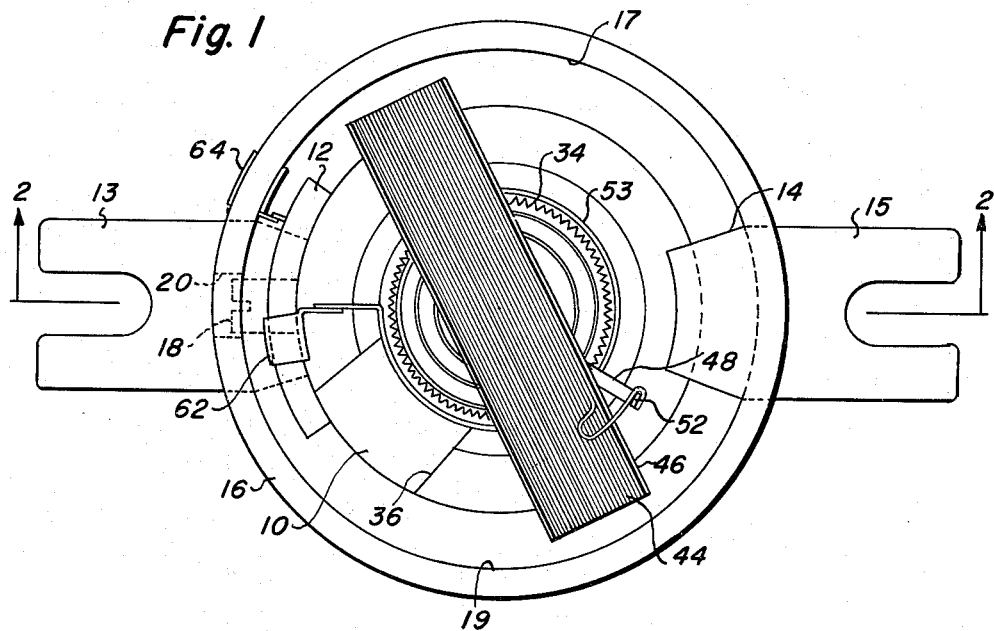
FIG. 1 is a top view of a first embodiment of an instrument constructed according to the invention.
Figure 2:
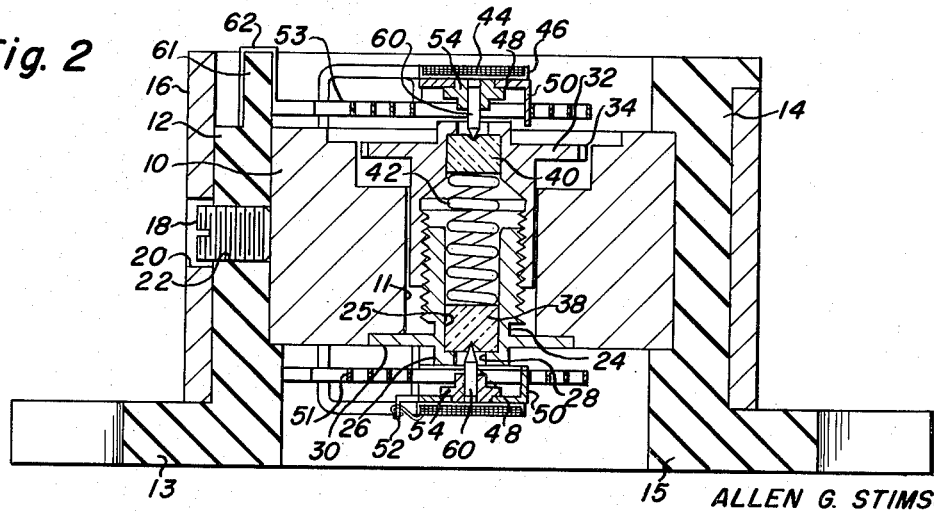
FIG. 2 is a sectional side view of the instrument shown in FIG. 1, taken along line 2—2 of FIG. 1.

Referring to FIGS. 1 and 2 a cylindrical permanent-magnet core 10 is supported in concentric spaced relation to a cylindrical soft iron magnetic keeper 16 by a pair of arcuate spacers 12 and 14 formed of insulating material and having respective bases 13 and 15 adapted for mounting. Core 10 is magnetized transversely to its cylindrical axis. Keeper 16, which forms the return path for the flux of the permanent-magnet core 10, may be keyed to spacers 12 and 14 to prevent angular movement of the keeper relative to the spacers. A locking screw 18 extends through an aperture 20 in keeper 16 and is in threading engagement with spacer 12 at 22. The locking screw cooperates with the side of the core magnet 10 for retaining the core magnet tightly against keeper 16. Locking screw 18 therefore takes up all clearances between the core magnet 10, spacer 14 and keeper 16. Depending upon tolerances provided in these parts, there may be a space between the core magnet and spacer 12. Keeper 16 may be initially out of round and forced into a true cylindrical shape by the tightening of the locking screw 18.

A lower bearing holder 24 is formed as a cylindrical sleeve extending into a central, axial bore 11 of core magnet 10. Holder 24 has an inwardly extending flange 26 with a central aperture 28 and has an internal cavity 25 for receiving a first conically recessed jewel bearing 38. An outwardly extending flange 30 of holder 26 is provided for cementing this holder to a lower face of the core magnet 10, which face is finished, preferably by centerless grinding. An upper holder 32 is formed similarly to the lower holder 24 to receive a second jewel bearing 40 and is in threading engagement with holder 24 inside the axial bore 11 of the core magnet. The upper holder 32 has a circumferentially toothed flange 34 by means of which a suitable wrench (not shown) with complementary teeth may be employed for rotating holder 32, thereby moving it axially relative to the lower holder 24 for adjusting the bearing spacing and tension. A cavity 36 (FIG. 1) is provided in the upper surface of the core magnet to receive the adjusting wrench. A coil spring 42 extends between bearings 38 and 40 for yieldably maintaining the bearings outwardly against the inturned ends of their respective holders 24 and 32.

An energizing coil 44 is supported on a rectangular coil frame 46 (see also FIGS. 3–6) and is adapted to pivot around the axis of core magnet 10 in opposed arcuate openings 17 and 19 between the core magnet and keeper 16, the limits of these openings being defined by the extremities of spacers 12 and 14. Hereafter in the specification and claims, the term "coil" will be understood to refer to both the coil 44 and its frame 46, unless specific reference is made to one of these members separately by number.

A pair of anchor members 48 are secured to the inside surface of coil frame 46 at the top and bottom of the frame, respectively. An inwardly extending first arm 50 of each anchor member 48 cooperates with and anchors the inner end of a respective lower and upper return spring 51 and 53. A second, outwardly extending arm 52 of each anchor member 48 is connected to a respective end of coil 44. A respective pivot holder 54 is centered in each anchor member 48 and retains a respective conically tipped pivot post 60 in engagement with the upper and lower bearing 38 or 40, thereby permitting the entire coil assembly to move angularly about the pivots on the axis of the core magnet 10. The outer end of the upper return spring 53 is soldered or otherwise connected to an upper rider 62 which is adapted for frictional engagement with an upper arcuate portion 61 of spacer 12 and may be moved along portion 61 of the spacer for adjusting the tension in spring 53. Similarly, the outer end of the lower return spring 51 is connected to a rider 64 which is in frictional engagement with the bottom surface of the magnetic keeper 16 and may be moved along that surface for adjusting the tension in spring 51. Electrical energy for operating the instrument may be applied to coil 44 through the respective riders 62 and 64 and their associated springs 53 and 51.

Figure 3:
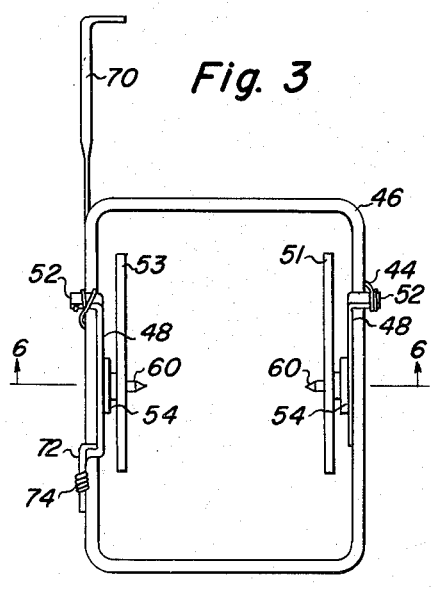
FIG. 3 is a rotated side view of the coil assembly of the instrument.
Figure 4:
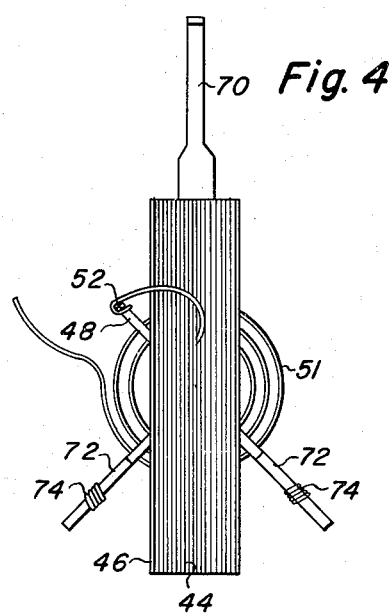
FIG. 4 is a bottom view of the coil assembly.
Figure 5:
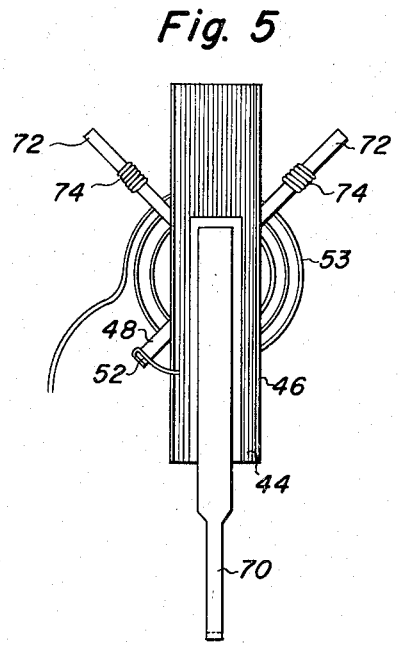
FIG. 5 is a top view of the coil assembly.
Figure 6:
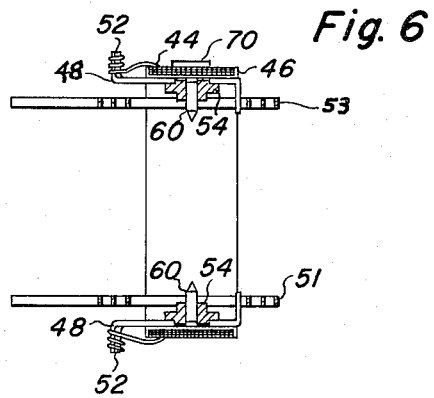
FIG. 6 is a sectional side view of the coil assembly, taken along the line 6—6 of FIG. 3.

Referring to FIGS. 3, 4 and 5, the upper anchor member 48 may have integral therewith a pointer 70 and one or more balancing arms 72 with respective balancing weights 74. The pointer may be used in cooperation with any suitable scale member (not shown), for example a scale of camera diaphragm openings if the electrical input to the instrument is received from a photo-electric cell.

Figure 7:
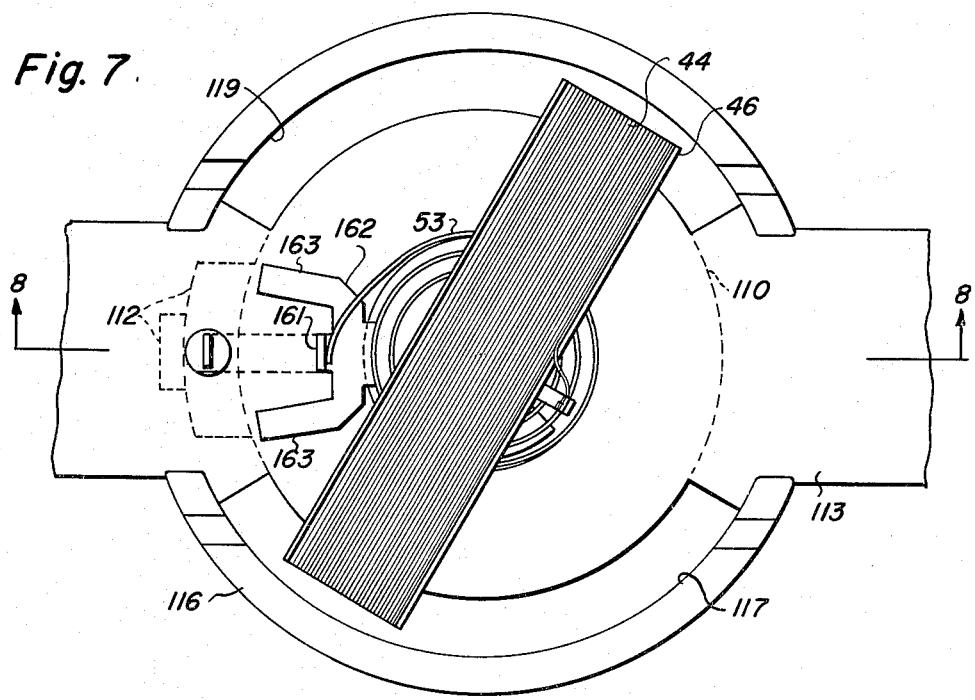
FIG. 7 is a top view of a second embodiment of an instrument constructed according to the invention.
Figure 8:
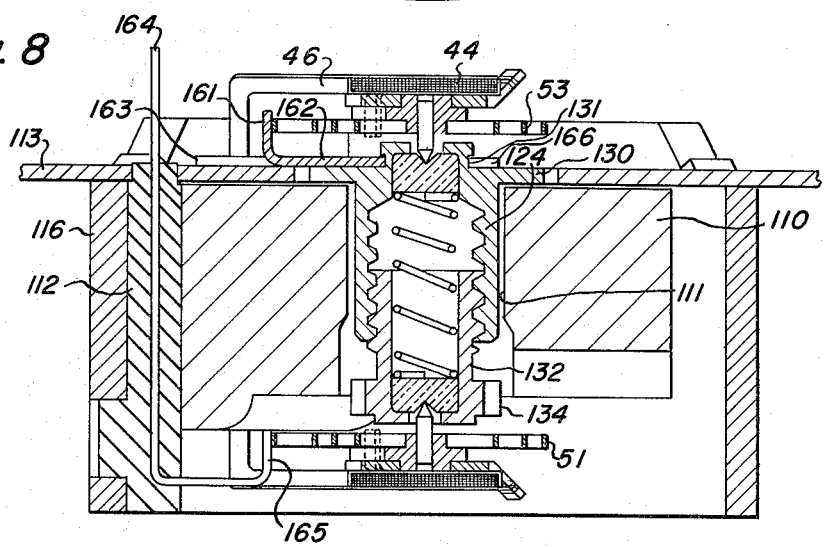
FIG. 8 is a sectional side view of the instrument shown in FIG. 7, taken along line 8—8 of FIG. 7.
Figure 9:
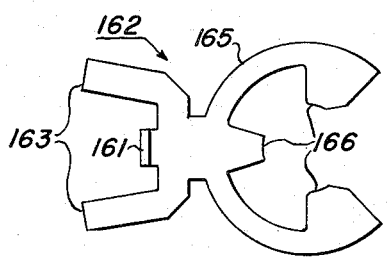
FIG. 9 is a top view of the zero adjusting member of the instrument.

The instrument disclosed in FIGS. 7, 8 and 9 employs the same basic form of bearing support as the instrument disclosed in FIGS. 1–6, but is modified slightly in its support structure.

The cylindrical core magnet 110 is concentric with a cylindrical keeper 116, which is keyed to a platform 113. An arcuate post 112 formed of insulating material is inserted into the space between the core magnet and the keeper. A first bearing holder 124 is cemented by a flange 130 to a finished face of the core magnet 110 and supports a second bearing holder 132 in threading engagement. Holder 132 has a toothed flange 134 by means of which the latter holder may be rotatably adjusted to vary the bearing tension, as described in relation to the first embodiment. Both bearing holders extend into an axial bore 111 of the core magnet 110. The core 110, platform 113 and keeper 116 form two arcuate paths 117 and 119 in which the sides of the coil 44 may move.

The coil 44, its frame 46 and the remainder of the rotatable coil assembly are substantially as described in relation to FIGS. 1–6. The upper return spring 53 has its outer end secured to a central arm 161 of a zero-adjusting plate 162 shown best in FIG. 9. Outer arms 163 of plate 162 may be used to turn the adjusting plate about the core axis, where ears 166 on an extension 165 of the adjusting plate engage an annular ring 131 of the upper bearing holder 124. The engagement between plates 162 and bearing holder 124 is frictional to maintain the plate in any position to which it is rotated. Arm 161 of plate 162 may be employed as one electrical terminal for suplying energy to coil 44. A second electrical terminal 164 for the coil extends through the insulating post 112 and has a U-shaped foot 165 to which the outer end of lower return spring 151 is secured.

The invention has been described in detail with particular reference to preferred embodiments thereof, but it will be understood that variations and modifications can be effected within the spirit and scope of the invention as described hereinabove and as defined in the appended claims.

We claim:

1. An electric measuring instrument comprising, in combination: a movable coil of rectangular form; a transversely magnetized cylindrical permanent magnet core having an axial bore and disposed within said coil; a hollow, cylindrical soft-iron keeper surrounding said core in substantially concentric relation thereto and spaced from said core to form a return path for the magnetic flux of said core and to form respective arcuate paths of movement for a first pair of opposite sides of said coil; a first bearing holder secured to said core and extending into said bore; a second bearing holder adjustably supported by said first holder within said bore; a respective bearing supported by each of said holders within said bore; means yieldably urging each of said bearings away from the other bearing; and respective pivot means mounted on each of a second pair of opposite sides of said coil on the inner surface thereof, each pivot means being disposed in cooperative relation with a respective one of said bearings.

2. An electric measuring instrument comprising, in combination: a movable coil of rectangular form; a transversely magnetized cylindrical permanent magnet core having an axial bore and disposed within said coil; a hollow, cylindrical soft-iron keeper surrounding said core in substantially concentric relation thereto and spaced from said core to form a return path for the magnetic flux of said core and to form respective arcuate paths of movement for a first pair of opposite sides of said coil; a first holder secured to said core and extending into said bore; a second holder adjustably supported by said first holder within said bore; and complementary bearing means for mounting said coil for pivotal movement about said core, including a pair of first bearing means, each yieldably retained by a respective one of said holders and a pair of second bearing means, each supported by a respective one of a second pair of opposite sides of said coil on the inner surface thereof in cooperative relation with an associated one of said first bearing means.

3. The electric measuring instrument defined in claim 2, wherein said holders are in mutual threading engagement.

4. The electric measuring instrument defined in claim 3, wherein said second holder has a toothed flange adapting said second holder for manual rotation by a tool having complementary teeth, for adjusting the separation of said pair of first bearing means.

5. The electric measuring instrument defined in claim 2, wherein both of said first pair of bearing means are in engagement with and urged apart by a single coil spring.

6. The electric measuring instrument defined in claim 2, with an arcuate spacer formed of insulating material and interposed between said core and said keeper.

7. The electric measuring instrument defined in claim 6, with: a second arcuate spacer formed of insulating material and interposed between said core and said keeper substantially in diametric opposition to said first-named spacer; and a locking screw extending through a hole in said keeper and in threading engagement with a hole in one of said spacers for bearing against the outer cylindrical surface of said core, thereby to secure said core, spacers and keepers firmly together.

8. The electric measuring instrument defined in claim 2, with: a spiral spring having one end secured to said coil; an insulating post interposed between said core and said keeper; and a terminal extending through said post and secured to the other end of said spring.

References Cited in the file of this patent

UNITED STATES PATENTS

| 2,355,649 | Hickok | Aug. 15, 1944 |
| 2,607,812 | Lederer | Aug. 19, 1952 |

FOREIGN PATENTS

| 658,170 | Great Britain | Oct. 3, 1951 |

OTHER REFERENCES

Publication, "A New Instrument Mechanism," AIEE Miscellaneous Paper 49–162, May 1949.